United States Patent [19]

Johnson et al.

[11] Patent Number: 4,691,732
[45] Date of Patent: Sep. 8, 1987

[54] POOL CHLORINATOR

[75] Inventors: Bruce R. Johnson, Sebastopol; Ralph A. Falconer, Novato, both of Calif.

[73] Assignee: Jandy Industries, Inc., Novato, Calif.

[21] Appl. No.: 892,037

[22] Filed: Aug. 1, 1986

[51] Int. Cl.⁴ .............................................. B01D 11/02
[52] U.S. Cl. ................... 137/268; 422/264; 422/282
[58] Field of Search ............ 137/268; 422/264, 264 B, 422/282, 263

[56] References Cited

U.S. PATENT DOCUMENTS

| | | | |
|---|---|---|---|
| 2,113,203 | 4/1938 | Straubel | 137/268 X |
| 3,195,558 | 7/1965 | Klueber | 137/268 |
| 3,482,740 | 12/1969 | Evans | 137/268 X |
| 4,333,493 | 6/1982 | Beiswenger | 137/268 |
| 4,350,666 | 9/1982 | Klutts | 137/268 X |
| 4,402,912 | 9/1983 | Krueger | 137/268 X |
| 4,584,106 | 4/1986 | Held | 137/268 X |

Primary Examiner—Alan Cohan
Attorney, Agent, or Firm—Melvin R. Stidham

[57] ABSTRACT

There is disclosed a device for dispensing a chemical wherein a stack of dry chemical tablets are contained within a receptacle. Sealing means are provided to seal around each tablet and the inner wall of the canister so that only the upper surface of the top tablet is exposed to the circulating water. The tablets are not exposed to the flowing water until the tablets above have been eroded away successively to provide leak paths around them.

4 Claims, 2 Drawing Figures

[4,691,732]

POOL CHLORINATOR

BACKGROUND OF THE INVENTION

A system commonly employed for introducing chemicals into a circulating water of a pool or a spa involves the provision of a container for compressed tablets of the chemical in dry form through which circulating water is diverted to erode the tablets and carry the chemical down the line in solution. One problem encountered in such chemical dispensers or chlorinators is that, while the chemical content of the water tends to be rather high when the container is first loaded and more tablets are exposed to erosion by the flowing water, the chemical content falls off as fewer and fewer tablets are so exposed.

OBJECTS OF THE INVENTION

It is an object of this invention to provide a chemical dispenser for a pool wherein chemicals in tablet form are eroded and dissolved more slowly and for a more extended period of time.

It is a further object of this invention to provide a pool chlorinator wherein chlorine in tablet form is entered into solution at a controlled rate.

Further objects and advantages of this invention will become apparent from the description to follow, particularly when read in conjunction with the accompanying drawing.

SUMMARY OF THE INVENTION

In carrying out this invention, we provide a receptacle or canister wherein a plurality of chemical tablets, e.g. dry chlorine, are stacked. A supply of water is drawn from the pool circulating system, and diverted to enter the canister and flow over the top of the stacked tablets. The water, with some of the chemical in solution, then flows back up to exit and flow down the line. Seal means are provided around the tablets to seal between each tablet and the inner wall of the canister so that only the top tablet is exposed to the water until it has been eroded to the extent that a flow path is eroded around the top tablet to expose the top of the next tablet.

DESCRIPTION OF A PREFERRED EMBODIMENT

Figure 1:
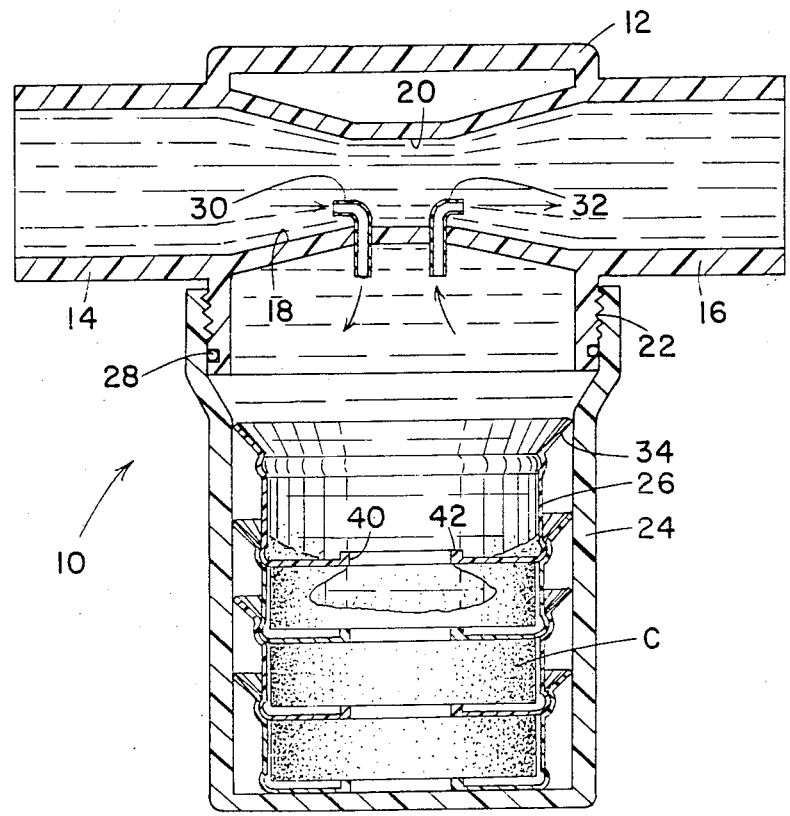
FIG. 1 is a vertical section view of a preferred embodiment of this invention.

Referring now to the drawing with greater particularity, the pool chlorinator 10 of this invention comprises a cap portion 12 having aligned flow passageways 14 and 16 for connection into the circulation line (not shown) of a swimming pool or spa. Within the cap, the flow passageways taper down in diameter at 18 to form a venturi throat 20 wherein there is a low pressure zone.

Figure 2:
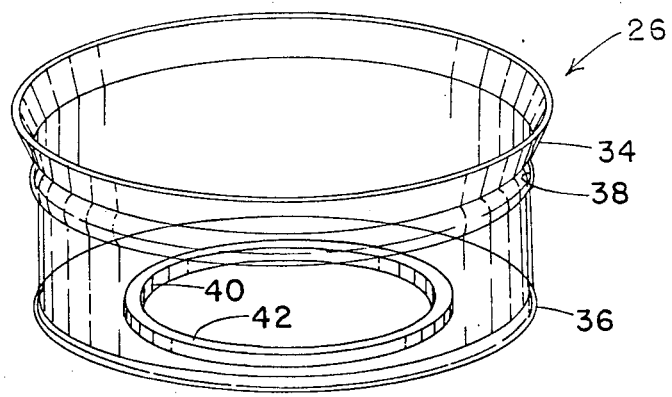
FIG. 2 is a view in perspective of a cup in which a chlorine tablet is contained.

Secured to the cap 12 as by threading at 22 is a canister or receptacle 24 of a size to receive a stack of open top cups 26 (FIG. 2). The cannister 24 is sealed off by an O-ring 28 to render it watertight.

Water is drawn off from the inlet flow passageway 18 and delivered to the receptacle 24 through an inlet scoop 30, and then is drawn from the receptacle 24 through the outlet port 32 to the low pressure zone 20, from which it is carried to the downstream passageway 16. As the water circulates through the canister it contacts, erodes and dissolves a quantity of chlorine to carry it downstream with the water in the flow passageway.

In the embodiment shown, each cup 26 contains a chlorine tablet C. Each cup has an outer, inclined lip 34 or flange that engages and seals around the cylindrical receptacle 24, whereby water is prevented from circulating around the stacked cups. A bead 36 around the bottom of each cup 26 is nested into a complementary annular recess 38 around the upper end of the next lower cup. An opening 40 in the bottom of each cup permits flow of water from one cup to the next, but such flow is initially prevented by sealing engagement of a capsule with an annular sealing lip 42 around the opening 40.

In operation, a stack of cups 26, each with a chlorine tablet C, is placed within the receptacle 24 and the receptacle is secured to the cap 12. Then, with water circulating in the flow line 14, 16, the inlet duct 30, facing into the flowing stream, draws off a quantity of water to circulate down over the top of the uppermost tablet C. With the sealing flanges 34 engaging the wall of the canister, and with each tablet sealed on the annular sealed lip 42, the flow of water is restricted to the top tablet C until there has been sufficient erosion to create a leak path past the tablet and through the central opening 40 to contact the next tablet. Hence, erosion of the tablets is greatly retarded, and there is a more even distribution of chemical into the downstream flow.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. A chemical dispenser for a pool or spa comprising:
    a receptacle receiving a stack of dry, soluble chemical tablets;
    coupling means on said receptacle adapted for connection into a water circulation line;
    inlet and outlet ducts for introducing water from said coupling means into said receptacle at one end of said receptacle and for returning water from said one end to said coupling means; and
    sealing means comprising a plurality of annular seal members, each engaging around and between one of said chemical tablets in said stack thereof and the inner wall of said receptacle to prevent flow of water from said one end of the receptacle past that tablet closest thereto.

2. The chemical dispenser defined by claim 1 wherein said sealing means comprises:
    a sealing lip around the top of each of said seal members to engage around said inner wall of the receptacle.

3. The chemical dispenser defined by claim 1 wherein said sealing means comprises:
    a stack of collars in said receptacle;
    an upper annular lip around each of said collars to engage and seal around said inner wall; and
    a lower lip around each of said collars to engage around a tablet.

4. The chemical dispenser defined by claim 1 wherein said sealing means comprises:
   a cylindrical cup to receive each chemical tablet in a stack thereof;
   an opening through the bottom of said cup;
   an outer seal lip around the rim of said cup to engage and seal around said inner wall; and
   an inner lip around said opening to engage and seal against a tablet in said cap.

* * * * *